United States Patent [19]

Matsui

[11] Patent Number: 4,930,931

[45] Date of Patent: Jun. 5, 1990

[54] INSTRUMENT FOR ASSEMBLING BOARD-SHAPED BODIES

[75] Inventor: Kazuhiro Matsui, Aichi, Japan

[73] Assignee: Kabushiki Kaisha Kojima Shohten, Tokyo, Japan

[21] Appl. No.: 294,763

[22] Filed: Jan. 6, 1989

[30] Foreign Application Priority Data

Feb. 4, 1988 [JP] Japan .................. 63-024487

[51] Int. Cl.$^5$ .............. B25G 3/00; F16B 9/00
[52] U.S. Cl. .................. 403/231; 403/252; 403/322; 403/407.1
[58] Field of Search ............ 403/407.1, 245, 246, 403/231, 322, 264, 252, 255, 405.1

[56] References Cited

U.S. PATENT DOCUMENTS

| 4,345,849 | 8/1982 | Steviemann | 403/252 |
| 4,549,831 | 10/1985 | Lautenschlager, Jr. | |
| 4,582,446 | 4/1986 | Salice | 403/322 X |
| 4,664,548 | 5/1987 | Brinkmann | 403/231 X |
| 4,693,630 | 9/1987 | Giovannetti | 403/405.1 |
| 4,787,769 | 11/1988 | Michael | 403/322 X |

FOREIGN PATENT DOCUMENTS 2546751 4/1977 Fed. Rep. of Germany ...... 403/231

61-19117 2/1986 Japan .

Primary Examiner—Peter M. Cuomo
Attorney, Agent, or Firm—Flynn, Thiel, Boutell & Tanis

[57] ABSTRACT

An instrument for assembling two board-shaped bodies, including an engagement tool adapted to be driven into an opening in one board-shaped body, and a fixing tool adapted to be driven into an opening in the other board-shaped body. The engagement tool includes an annular engagement member having a radially outwardly projecting engagement portion provided with an engagement pawl adjacent the tip thereof, and a rotary cam or eccentric which is rotatably positioned within the annular member to effect radial displacement of the pawl. The engagement tool also includes an annular housing which accommodates therein the annular engagement member, the housing having stops for controlling the rotation of the cam to a predetermined angle, and having an outer peripheral structure which permits it to fixingly engage the one board-shaped body. The fixing tool has an insertion hole into which the engagement portion is inserted, and an engagement pin engaged by the pawl to lock the tools together. The fixing tool has an annular outer periphery structure for fixedly securing the fixing tool to the other board-shaped body.

8 Claims, 7 Drawing Sheets

INSTRUMENT FOR ASSEMBLING BOARD-SHAPED BODIES

FIELD OF THE INVENTION

The present invention relates to an instrument for assembling board-shaped bodies and, more particularly, to an instrument for assembling pieces of furniture or the like.

BACKGROUND OF THE INVENTION

An instrument for assembling two board-shaped bodies has hitherto been known, as is disclosed in Japanese Utility Model Laid-Open No. 19117/1986. The disclosed instrument comprises a first member which is adapted to be threaded onto one board-shaped body and comprises a vertical mounting piece and a tongue piece integrally extending from the mounting piece, and a second member which is adapted to be threaded onto the other board-shaped body and has a screw member provided for the fastening as well as a horizontal top plate formed with a through screw hole into which the screw member is threaded. With this known instrument, the tongue plate is fitted into a fitting cavity formed below the through screw hole of the second member and, thereafter, the screw member is fastened. By this operation, the tapered shaft portion of the screw member is brought into contact with the edge at the tip of an elongated hole formed through the tongue piece, and the first member is fastened onto the second member, thereby assembling the two board-shaped bodies.

However, the above-described assembling instrument in which both the first and second members are threaded onto the board-shaped bodies encounters a problem in that, particularly when the board-shaped bodies are pieces of compressed plywood, such as particle board, if the screw is fastened excessively tight or if a large load is applied to the assembling instrument, the screw may become loosened or disengaged.

The present invention has been developed in order to solve the above-stated problem, and an object of the present invention is to provide an assembling instrument which is capable of firmly assembling board-shaped bodies even when the instrument is used to assemble pieces of compressed plywood such as particle board.

SUMMARY OF THE INVENTION

The present invention is directed to an instrument for assembling two board-shaped bodies, which instrument comprises:

an engagement tool adapted to be driven into a part of one board-shaped body, the engagement tool having an engagement member comprising an annular portion and an engagement portion formed normally on the outer peripheral surface of the annular portion and provided at the tip thereof with an engagement pawl, a rotary member fitted within the annular portion and adapted to rotate to thereby move the engagement member in an engagement direction, and a case accommodating the engagement member and the rotary member and adapted to regulate the rotation of the rotary member to a predetermined angle and having slip-off prevention stepped grooves formed on the outer periphery thereof; and a fixing tool adapted to be driven into a part of the other board-shaped body, the fixing tool having an insertion hole into which the engagement portion is inserted, and an engagement pin with which the engagement pawl of the engagement member engages by the rotation of the rotary member, the fixing tool having on the outer periphery thereof a member and stepped grooves which are provided for the prevention of slip-off.

When the engagement tool is first driven into one board-shaped body, the stepped grooves on the outer periphery of the case bite into the one board-shaped body, thereby firmly fixing the engagement member in place. When the fixing tool is driven into the other board shaped body, the slip-off prevention member and stepped grooves of the fixing tool bite into the other board-shaped body, thereby firmly fixing the fixing member in place.

Subsequently, the engagement member of the engagement tool is inserted into the insertion hole of the fixing tool. With this condition, the rotary member is rotated through a predetermined angle. During this rotation, the rotary member moves the annular portion of the engagement member in its engagement direction so as to bring the engagement pawl of the engagement member into engagement with the engagement pin. In consequence, the two board-shaped bodies are firmly assembled.

BRIEF DESCRIPTION OF THE DRAWINGS

The drawings illustrate a preferred embodiment of an instrument for assembling board-shaped bodies in accordance with the present invention, wherein.

DETAILED DESCRIPTION

Figure 1:
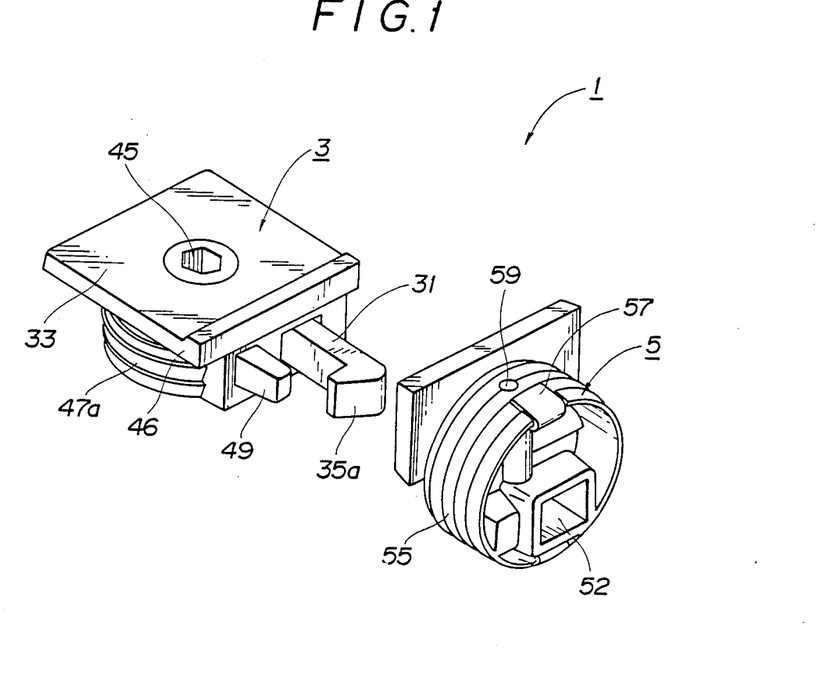
FIG. 1 is a perspective view showing the instrument for assembling board-shaped bodies.

As shown in FIG. 1, an instrument 1 for assembling (i.e. joining) two board-shaped bodies comprises an engagement tool 3 and a fixing tool 5.

Figure 2:
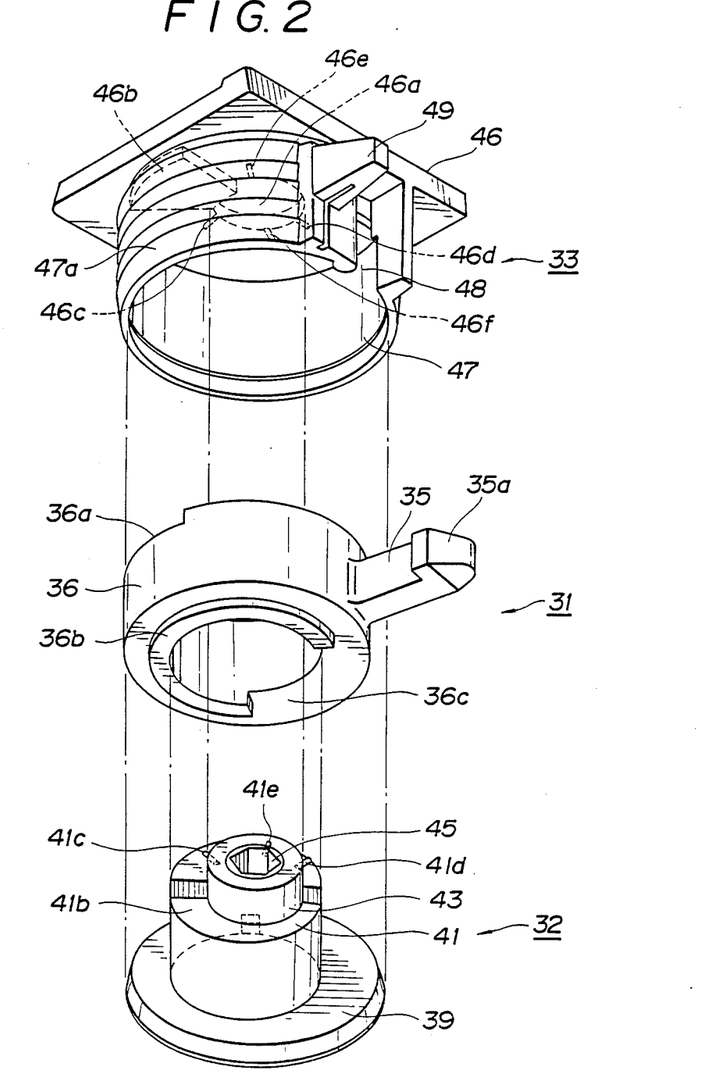
FIG. 2 is an exploded perspective view of an engagement member.

Referring to FIG. 2, the engagement tool 3 will be first described. The engagement tool 3 comprises an engagement member 31, a rotary member 32, and a case 33 accommodating the engagement member 31 and the rotary member 32. The engagement member 31 is loosely fitted within the case 33, and the rotary member 32 is fitted inside the engagement member 31.

The engagement member 31 comprises an engagement portion 35 and an annular portion 36. A recess 36a is formed in the upper surface of the annular portion 36 through a central angle of about 74 degrees. A peripheral rib-like wall 36b projects outwardly from the bottom surface of the annular portion 36. The peripheral wall 36b is notched through a central angle of about 100 degrees to form a notched portion 36c. The engagement portion 35 is normally formed on the outer peripheral surface of the annular portion 36 so as to project radially outwardly therefrom, and it has its tip formed into a hook-shape to provide an engagement pawl 35a.

Figure 3A:
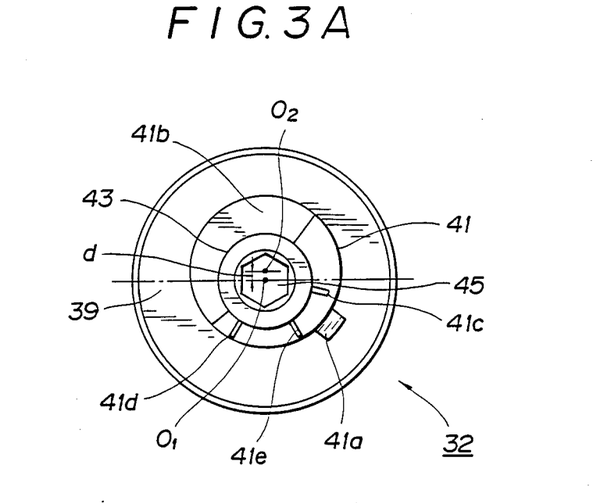
FIG. 3A is a plan view of a rotor portion.
Figure 3B:
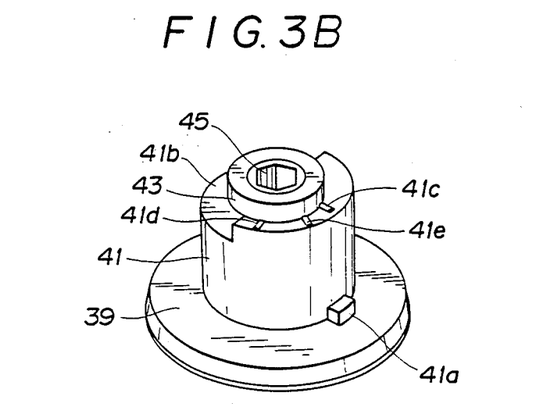
FIG. 3B is a perspective view of the rotor portion.

The rotary member 32 comprises a rotor portion 39 at one end, an intermediate cam portion 41, and a rotation hub 43 at the other end. A wrench hole 45 having the shape of a hexagonal prism longitudinally coaxially penetrates the rotary member 32. As shown in FIGS. 3A and 3B, a radial projection 41a is formed on the outer periphery of the cam portion 41, the projection 41a being located so as to be positioned within the above-mentioned notched portion 36c of the annular portion 36. A recess 41b is formed in the upper surface of the cam portion 41 over about one half of the circumference, while, in the other half of the circumference, two ridges (i.e. detents) 41c and 41d are formed in such a manner as to form a central angle of about 108 degrees therebetween with respect to the axial center $O_1$ of the rotation-hub 43. A further small ridge or detent 41e is formed at the middle angularly between the ridges 41c and 41d. The axial center $O_2$ of the cylindrical-shaped cam portion 41 is radially shifted (i.e. eccentric) from the axial center $O_1$ of the rotor 39 and hub 43 by a predetermined distance d.

As shown in FIG. 2, the case or housing 33 comprises a top plate 46, and a circumferential sleevelike wall 47 formed on and projecting downwardly from the lower surface of the top plate 46.

An axial hole 46a is formed through the center of the portion of the top plate 46 so as to be coaxially aligned with the cylindrical wall 47 (this wall 47 rotatably supports the rotor portion 39). A substantially fan-shaped projection (i.e., a stop) 46b is formed adjacent the axial hole 46a through a central angle of about 60 degrees and projects radially thereof. In additional to the projection 46b, three detent grooves 46c, 46d, 46e, as well as a small groove 46f are formed in the bottom surface of the plate 46. The grooves 46c, 46d, and 46e are disposed in such a manner as to form central angles of about 108 degrees therebetween with respect to the center of the axial hole 46a, while the small groove 46e is disposed at the middle between the grooves 46c and 46d. The grooves project radially outwardly away from the hole 46a.

The ridges 41c and 41d of the rotary member 32, described above, fit into these grooves 46c, 46d, and 46e so as to enable the determination of an engagement lock position and an engagement release position, as described later. The small ridge 41e fits into the small groove 46f so as to enable the determination of an engagement preparation position.

Stepped grooves 47a are formed in the outer wall of the circumferential wall 47. A part of the circumferential wall 47 is notched at 48 for permitting the projection 35 to extend therethrough, and a position-determining projection 49, which is used to bring the engagement tool 3 into engagement with the fixing tool 5, is formed in the vicinity of the notch 48 and projects radially outwardly from the wall 47.

Figure 4:
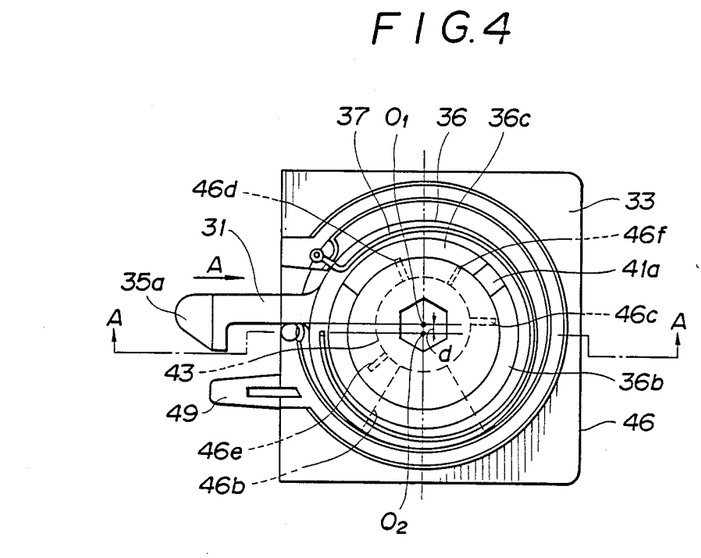
FIG. 4 is an explanatory view showing an engagement tool, with the rotor portion removed.
Figure 5:
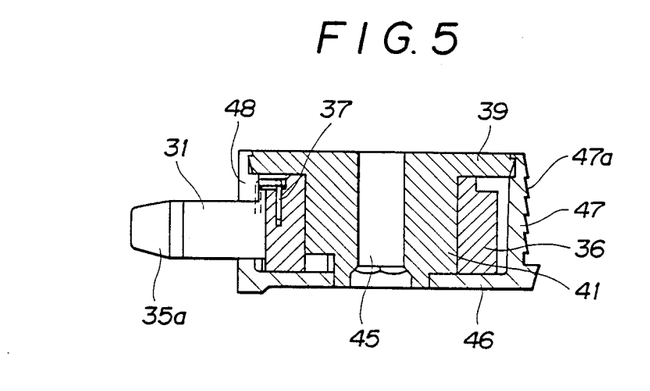
FIG. 5 is a sectional view taken along the line A—A shown in FIG. 4.

When the above-described engagement member 31, rotary member 32, and case 33 are integrated, as shown in FIGS. 4 and 5, the axial center $O_1$ of the rotation hub 43 and axial hole 46a is radially spaced from the axial center $O_2$ of the cam portion 41 by the predetermined distance d and, simultaneously, the annular portion 36 is accommodated within the case 33 with a certain play. Therefore, when the rotary member 32 rotates in the counterclockwise direction as viewed in FIG. 4, the cam portion 41 rotates in such a manner that the outer peripheral surface of the cam portion 41 slides on and presses against the inner peripheral surface of the annular portion 36, thereby causing the engagement member 31 to move in the direction of an arrow A. The engagement portion 35 is urged by a ring-shaped spring 37 in the counterclockwise direction as viewed in FIG. 4. This spring 37 is anchored at one end to the case 33, and at its other end to the engagement member 31.

Since the recess 41b formed in the upper surface of the cam portion 41 registers with the projection 46b of the case 33, the rotation of the cam portion 41 stops where the edge of the recess 41b abuts against the projection 46b, in either the clockwise or counterclockwise direction. In addition, since the recess 36a of the annular portion 36 also registers with the projection 46b of the case 33, the rotation of the annular portion 36 stops where the edge of the recess 36a abuts against the projection 46b, in either the clockwise or counterclockwise direction as viewed in the figure.

Figure 6:
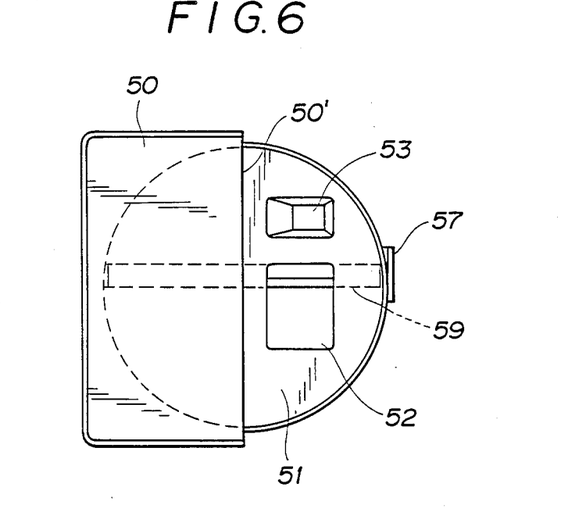
FIG. 6 is a plan view of a fixing tool.
Figure 7:
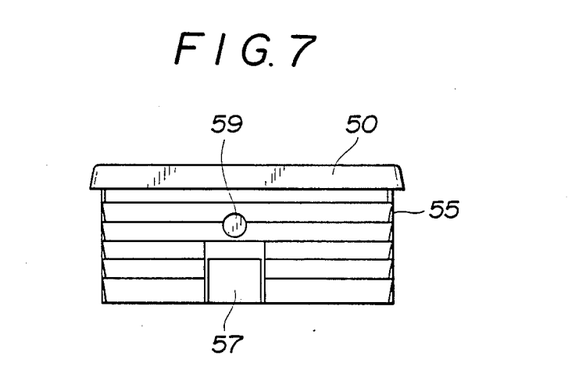
FIG. 7 is a side view or the same.
Figure 8:
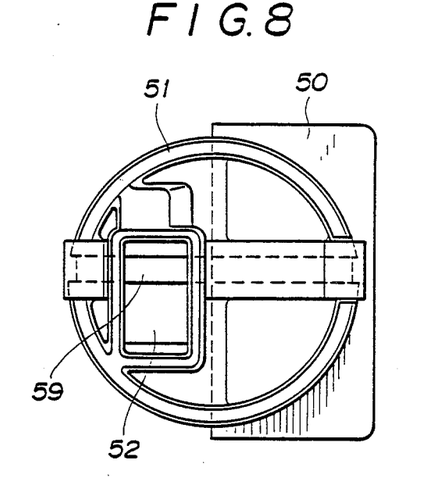
FIG. 8 is a bottom view of the same.

Next, the fixing tool 5 will be described. As shown in FIGS. 6 to 8, the fixing tool 5 comprises a position-determining plate 50 and a cylindrical driving member 51 connected to the position-determining plate 50 through one half of its circumference.

Figure 11:
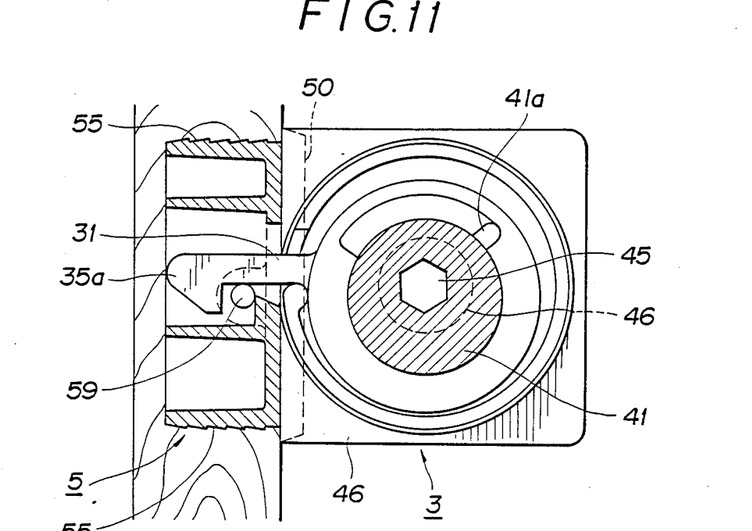
FIG. 11 is an explanatory view showing an initial state of engagement between the engagement tool and the fixing tool.
Figure 12:
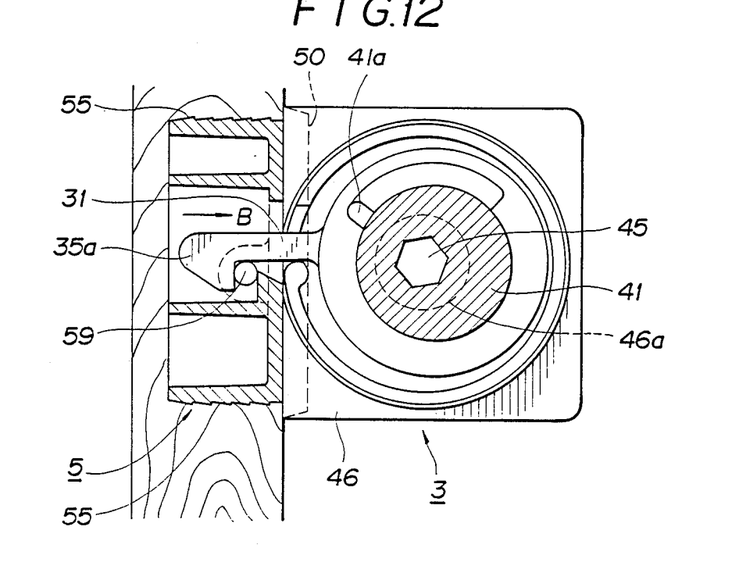
FIG. 12 is an explanatory view showing a state of engagement between the engagement tool and the fixing tool.

The position-determining plate 50 is positioned normally on the top plate 46 of the engagement tool 3 when the engagement tool 3 and the fixing tool 5 are temporarily engaged, to thereby determine the position of the engagement tool 3 and the fixing tool 5. That is, the plate 46 is disposed, so that the edge 50' abuts the top surface of the plate 46 along the edge thereof adjacent the engagement portion, with the plates 46 and 50 being disposed generally perpendicular to one another as shown in FIGS. 11 and 12.

Figure 9:
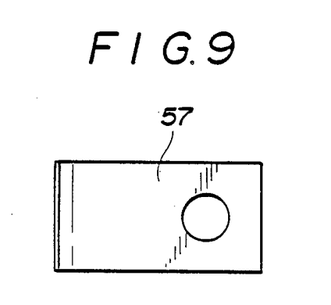
FIG. 9 is a plan view showing an invertedly-bent spring.
Figure 10:
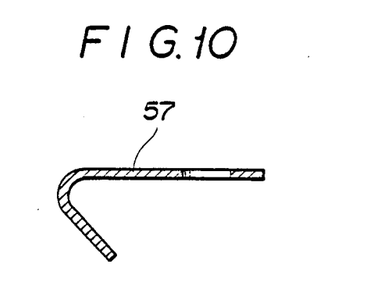
FIG. 10 is a side view of the same.

The driving member 51 has formed therein a first insertion hole 52 into which the engagement portion 35 of the engagement member 31 is inserted, and a second insertion hole 53 into which the position-determining projection 49 of the engagement member 31 is inserted. These holes 52 and 53 extend axially through the diametrical half of member 51 which is sidewardly spaced from plate 50. Stepped grooves 55 are formed around the outer cylindrical wall of the driving member 51 and, in addition, an invertedly-bent spring 57 is mounted on the outer wall. As shown in FIGS. 9 and 10, the invertedly-bent spring 57 has a substantially J-shaped configuration, and it is partly disposed on opposite cylindrical side surfaces of the driving member 51. Spring 57 is firmly fixed in place by a pin 59 which extends diametrically across the driving member 51. The pin 59 passes through a hole in the spring, and also penetrates through the first insertion hole 52 and is used as an engagement pin with which the engagement portion 35 engages.

OPERATION

The manner in which the above-described engagement tool 3 and the fixing tool 5 are used will be described.

First, a mounting hole (not shown) is formed in a first board-shaped body, e.g. a piece of compressed plywood, and the engagement tool 3 is placed in such a manner that the engagement member 31 extends in the direction aligned with the board surface. Thereafter, the engagement tool 3 is driven into the mounting hole to be fitted therein. By this operation, the stepped grooves 47a bite into the mounting hole, thereby fixing the engagement tool 3 in place. Further, when the fixing tool 5 is driven into a mounting hole (not shown) formed in another piece of compressed plywood, the invertedly-bent spring 57 and the stepped grooves 55 bite into the mounting hole, thereby firmly fixing the fixing tool in place. The invertedly-bent spring 57 is inserted into the mounting hole as it is being obliquely moved, but, when the fixing tool 5 is subjected to a pulling-out force, the spring bites into the inner wall of the mounting hole, thereby blocking the pulling-out force.

Subsequently, the two pieces of compressed plywood are placed normally (i.e. perpendicularly) to one another and, as shown in FIG. 11, when the engagement portion 35 of the engagement member 31 is inserted into the first insertion hole 52 of the fixing tool 5, the engagement pawl 35a of the engagement portion 35 abuts against then temporarily engages with the pin 59 by the urging force of the spring 37. With this condition, a tool such as a hexagonal wrench is inserted in the wrench hole 45 of the rotor portion 39, and the cam portion 41 is rotated through 90 degrees in the counterclockwise direction into the position shown in FIG. 12. As a result, as shown in FIG. 12, by the operation of the cam portion 41, the engagement member 31 is moved radially inwardly in the direction of arrow B through the maximum stroke to bring the engagement pawl 35a into engagement with the pin 59. This rotation of the cam portion 41 positions it in an area in which the cam portion 41 is kept from rotating in the opposite direction even if it is subjected to a load in the direction opposite to that of the arrow B. Further, when the cam portion 41 is rotated through 100 degrees, the ridges 41c and 41d of the cam portion 41 fit into the grooves 46d and 46e of the case 33 to fix the position of the cam portion 41, thereby locking the above-mentioned engagement. By the above-described operations, the two pieces of compressed plywood are firmly assembled.

When it is necessary to demount the engagement tool 3, the rotor portion 39 is first rotated in the clockwise direction as viewed in FIG. 12. By this operation, the ridges 41c and 41d of the cam portion 41 become disengaged from the grooves 46d and 46e of the case 33, and the engagement pawl 35a is moved in the direction opposite to that of the arrow B to become disengaged from the pin 59. When the cam portion 41 has been rotated through 100 degrees, the projection 41a of the cam portion 41 abuts against the circumferential wall 36b of the annular portion 36 so as to cause the annular portion 36 to rotate in the clockwise direction. Thus, the engagement portion 35 is allowed to rotate in the clockwise direction against the urging force of the spring 37. As a result, the engagement pawl 35a becomes separated from the pin 59, thereby enabling the engagement portion 35 to be disengaged from the fixing tool 5. When the cam portion 41 is rotated through 108 degrees, however, the ridge 41c and 41d of the cam portion 41 fit into the grooves 46c and 46d of the case 33, thereby fixing the position of the rotary member 32 as well.

As described above, the board-shaped body assembling instrument 1 in accordance with the foregoing embodiment is provided with a mechanism which very easily enables the engagement tool 3 and the fixing tool 5 to be temporarily engaged and thereafter be engaged firmly. Therefore, board-shaped bodies can be easily and firmly assembled.

Further, when the conventional assembling instrument which is adapted to be threaded into board-shaped bodies is used to assemble pieces of compressed plywood, it may encounter the problem that the screw becomes disengaged if a large load is applied to the assembling instrument. In contrast, the assembling instrument 1 in accordance with the foregoing embodiment has the fixing tool 5 provided with an invertedly-bent spring 57 which is firmly fixed in place by the pin 59 and which is capable of blocking a force acting to pull out the fixing tool. This arrangement enables the assembling instrument to withstand a large load even when it is used to assemble pieces of compressed plywood and also enables a rigid assembly of the instrument.

Still further, with the conventional assembling instrument, because part of the instrument projects above the surfaces of the board-shaped bodies, the board-shaped bodies on which the assembling instrument is mounted cannot be stacked, and there is a risk of damaging other board-shaped bodies during assembly. In contrast, with the assembling instrument 1 in accordance with the foregoing embodiment, since the engagement member 31 projects in the direction aligned with the surface of the board-shaped body, there is no risk of damaging other board-shaped bodies and the assembled board-shaped bodies can be stacked.

As described in detail, the instrument for assembling board-shaped (i.e. plate-like) bodies in accordance with the present invention comprises the engagement tool and the fixing tool and is provided with a mechanism in which the engagement pawl of the engagement tool engages with the engagement pin of the fixing tool, thereby enabling the board-shaped bodies to be firmly assembled. Further, since the engagement tool is provided with the slip-off prevention stepped grooves, while the fixing tool is provided with the member and stepped grooves for the prevention of slip-off, the instrument can withstand a large load even when it is used to assemble pieces of compression plywood or the like. In this way, the instrument enables firm assembly of pieces of compressed plywood.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. An instrument for assembling two board-shaped bodies, comprising:
   an engagement tool adapted to be driven into a part of one board-shaped body, said engagement tool having
   an engagement member comprising an annular portion and an engagement portion projecting radially outwardly from an outer peripheral surface of said annular portion and provided at the tip thereof with an engagement pawl,
   a rotary member rotatably fitted within said annular portion and adapted to rotate relative thereto to thereby move said engagement member in an engagement direction, and a case accommodating said engagement member and said rotary member, said case having means to regulate the rotation of said rotary member to a predetermined angle and also having a slip-off preventing stepped grooves formed on the outer periphery thereof for engagement with said one board-shaped body;

a fixing tool adapted to be driven into a part of the other board-shaped body, said fixing tool having an insertion hole into which said engagement portion is inserted, and an engagement pin with which said engagement pawl of said engagement member engages by the rotation of said rotary member, said fixing tool having on the outer periphery thereof a member and stepped grooves for engagement with said other board-shaped body for prevention of slip-off; and stop means coating between said case and said engagement member for limiting relative rotation therebetween.

2. An apparatus according to claim 1, including stop means coacting between said engagement member and said rotary member for limiting relative rotation therebetween.

3. An apparatus according to claim 1, wherein said rotary member includes detent means cooperable with said case for defining discrete rotational positions for said rotary member.

4. An apparatus for fixedly securing first and second plate-like bodies together in generally perpendicular relationship to one another, said apparatus comprising:

an engagement tool adapted to be fixedly secured to said first body, said engagement tool including an annular casing adapted to be positioned within an opening in said first body, said casing having means associated with an outer peripheral wall thereof for gripping engagement with a wall defining said opening for fixedly securing said annular casing within said opening, said casing having a slot extending radially therethrough, an annular engagement member loosely confined within the interior of said casing for permitting radial movement of said annular engagement member relative to said casing, said annular engagement member including an engagement portion projecting radially outwardly from an outer peripheral surface thereof in a cantilever fashion, said engagement portion terminating in a hook-like pawl at the radially outer free end thereof, said engagement portion projecting radially outwardly through the slot in said casing, and a rotary member having a portion which is rotatably and non-radially movably supported within said casing for rotation relative thereto about the axis of said annular casing, said rotary member having a cam part fixed thereto in eccentric relationship relative to said axis and rotatably disposed within the opening of said annular engagement member for effecting radial displacement of said engagement member relative to said annular casing in response to rotation of said rotary member, said annular casing having a plate-like portion which is fixed thereto at one axial end thereof, and said portion of said rotary member being annular and rotatably supported on said casing adjacent the other axial end thereof;

a fixing tool adapted to be fixedly secured within an opening of said second body, said fixing tool comprising a one-piece member having an annular part which is positionable within said last-mentioned opening said annular part having means on an outer peripheral surface thereof for gripping engagement with the wall defining said last-mentioned opening, said fixing tool having an opening projecting axially of said annular part for accommodating said engagement portion therein, and said fixing tool having an engagement element fixedly supported on said annular part and extending across said last-mentioned opening for engagement with the pawl on said engagement portion; and stop means coacting between said engagement member and said rotary member for limiting relative rotation therebetween to facilitate disengaging said pawl from said engagement element of said fixing tool, and stop means coacting between said casing and said engagement member for limiting relative rotation therebetween.

5. An apparatus according to claim 4, wherein said fixing tool includes a plate-like part which is fixed to said annular part adjacent one axial end thereof, said plate-like part extending over about one diametrical half of said annular part and having an edge which is adapted to abuttingly contact a surface of the plate-like portion associated with said casing.

6. An apparatus according to claim 4, wherein said casing has a projection which is fixed thereto and projects outwardly from the outer periphery thereof in generally parallel relationship with said engagement portion, and said fixing tool having a recess which opens axially of said annular part for snugly accommodating said projection therein.

7. An apparatus according to claim 4, including torsion spring means coacting between said casing and said engagement member for rotatably urging said engagement portion toward a position of engagement with said engagement element.

8. An apparatus for fixedly securing first and second plate-like bodies together in generally perpendicular relationship to one another, said apparatus comprising:

an engagement tool adapted to be fixedly secured to said first body, said engagement tool including an annular casing adapted to be positioned within an opening in said first body, said casing having means associated with an outer peripheral wall thereof for gripping engagement with a wall defining said opening for fixedly securing said annular casing within said opening, said casing having a slot extending radially therethrough, an annular engagement member loosely confined within the interior of said casing for permitting radial movement of said annular engagement member relative to said casing, said annular engagement member including an engagement portion projecting radially outwardly from an outer peripheral surface thereof in a cantilever fashion, said engagement portion terminating in a hook-like pawl at the radially outer free end thereof, said engagement portion projecting radially outwardly through the slot in said casing, and a rotary member having a portion which is rotatably and non-radially movably supported within said casing for rotation relative thereto about the axis of said annular casing, said rotary member having a cam part fixed thereto in eccentric relationship relative to said axis and rotatably disposed within the opening of said annular engagement member relative to said annular casing in response to rotation of said rotary member, said annular casing having a plate-like portion which is fixed thereto at one axial end thereof, and said portion of said rotary member being annular and rotatably supported on said casing adjacent the other axial end thereof;

a fixing tool adapted to be fixedly secured within an opening of said second body, said fixing tool comprising a one-piece member having an annular part which is positionable within said last-mentioned opening said annular part having means on an outer peripheral surface thereof for gripping engagement with the wall defining said last-mentioned opening, said fixing tool having an opening projecting axially of said annular part for accommodating said engagement portion therein, and said fixing tool having an engagement element fixedly supported on said annular part and extending across said last-mentioned opening for engagement with the pawl on said engagement portion; and stop means coacting between said engagement member and said rotary member for limiting relative rotation therebetween to facilitate disengaging said pawl from said engagement element of said fixing tool, rotary stop means cooperating between said casing and said rotary member for limiting the rotational displacement of said rotary member, and detent means coacting between said casing and said rotary member for defining discrete positions for said rotary member.

* * * * *

UNITED STATES PATENT AND TRADEMARK OFFICE
CERTIFICATE OF CORRECTION

PATENT NO. : 4 930 931

DATED : June 5, 1990

INVENTOR(S) : Kazuhiro MATSUI

It is certified that error appears in the above-identified patent and that said Letters Patent is hereby corrected as shown below:

Column 7, line 4; delete "a". (second occurrence)

Column 7, line 18; change "coating" to ---coacting---.

Column 8, line 3; after "opening" insert ---,---.

Column 9, line 1; after "member" insert ---for effecting radial displacement of said engagement member---.

Column 9, line 12; after "opening" insert ---,---.

Signed and Sealed this

Thirty-first Day of December, 1991

Attest:

HARRY F. MANBECK, JR.

*Attesting Officer*    *Commissioner of Patents and Trademarks*